May 5, 1942.  A. E. LANIGAN  2,281,848

SAFETY APPLIANCE FOR ELECTRICALLY HEATED APPARATUS

Filed Oct. 31, 1938  2 Sheets-Sheet 1

Inventor
ALFRED E. LANIGAN

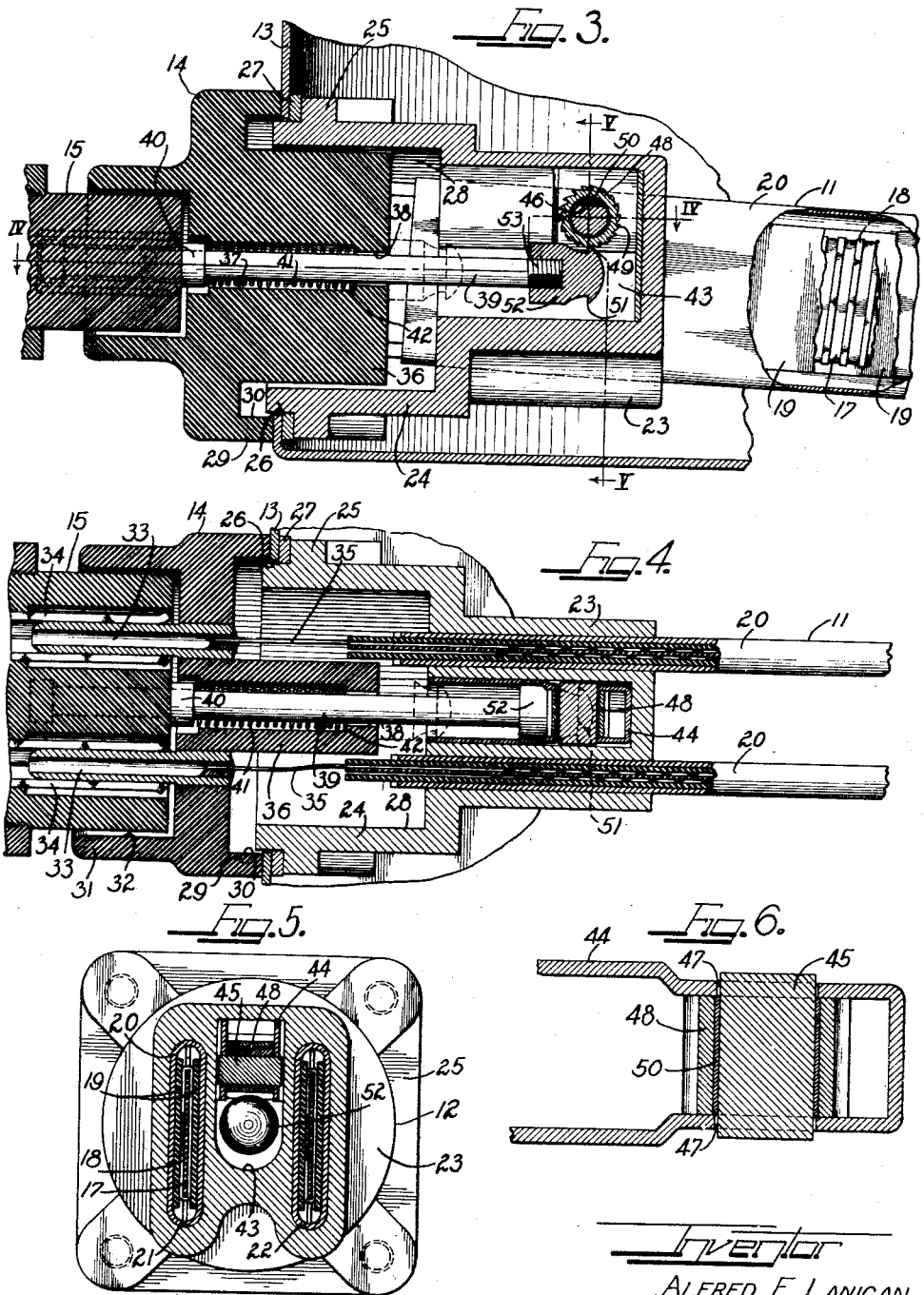

Patented May 5, 1942

2,281,848

UNITED STATES PATENT OFFICE 2,281,848

SAFETY APPLIANCE FOR ELECTRICALLY HEATED APPARATUS

Alfred E. Lanigan, Ferndale, Mich., assignor to Electromaster, Inc., Detroit, Mich., a corporation of Michigan Application October 31, 1938, Serial No. 237,848

3 Claims. (Cl. 200—142)

The present invention relates in general to safety appliances or devices of the type wherein means are provided for automatically interrupting an electrical circuit upon the occurrence of abnormal operating temperatures, and is particularly concerned with such devices as may be utilized for protecting electrically heated cooking and heating apparatus, such as electric teakettles, percolators, and the like.

The invention as used with such apparatus contemplates an arrangement in which the electrical connection will be maintained so long as the apparatus contains a liquid, but will immediately operate to automatically disconnect the electrical connection in the event that the liquid evaporates to such an extent as to subject the apparatus to possible damage by becoming overheated.

It is a further object of the invention to provide an improved safety appliance which is latched against operation at normal temperatures, but which will be unlatched for operation at abnormal temperatures, and which includes a novel and improved resetting mechanism for the latch.

While the invention will be described in connection with its use for protecting heating and cooking apparatus, it will be apparent to those skilled in the art that the novel construction embodied therein may with equal facility be utilized in connection with other devices and apparatus.

Other objects and features of the invention will more fully appear from the following detailed description taken in connection with the accompanying drawings which illustrate a single embodiment thereof, and in which:

Figure 3 is an enlarged fragmentary view including a longitudinal section through the safety appliance constituting the present invention, as taken substantially on line III—III of Figure 2;

Figure 4 is a similar view including a section through the safety appliance, taken substantially on line IV—IV of Figure 3;

Figure 5 is a transverse sectional view showing the cooperative relationship of the parts of the latching mechanism, taken substantially on line V—V of Figure 3; and Figure 6 is an enlarged detail view in section showing the mounting of one of the latching members and the manner in which it is anchored against movement at normal temperatures.

As shown on the drawings:

Figure 1:
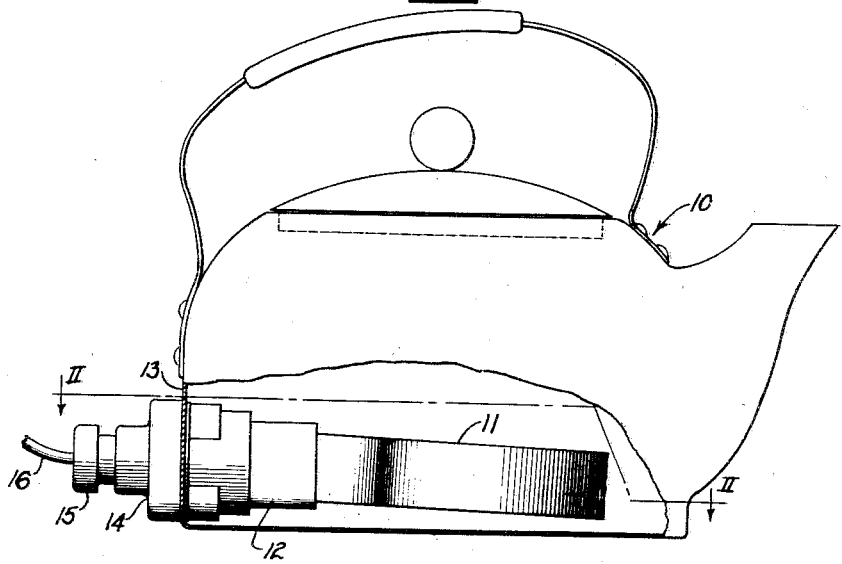
Figure 1 is a view in elevation of electrical apparatus, in this instance an electrically heated teakettle, a portion of the side walls thereof being cut away to disclose the manner in which the present invention may be embodied therein.
Figure 2:
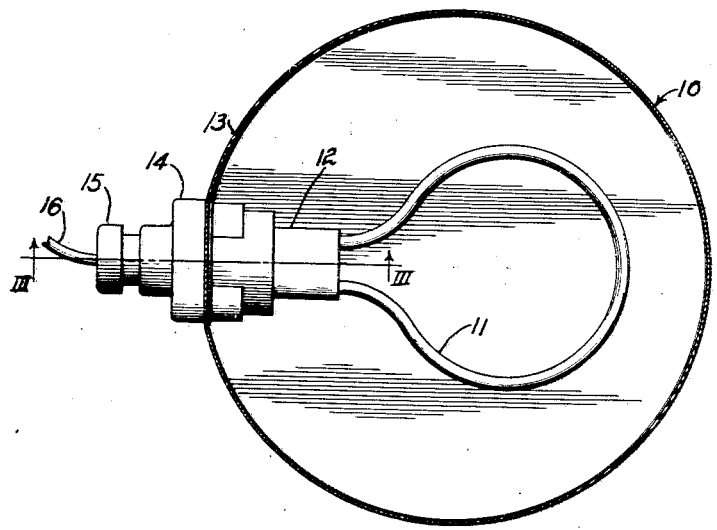
Figure 2 is a transverse sectional view of the teakettle showing the association of the present invention therewith; the section being taken substantially on line II—II of Figure 1.

Referring to Figure 1, the invention is shown as being applied to an electrically heated apparatus, in this instance a teakettle as generally indicated at 10.

As shown, there is supported adjacent the teakettle bottom a heating element 11 of general split-ring construction, the ends of the heating element being supported in a base 12 secured to the teakettle wall 13. Associated with the base 12 and disposed outside of the teakettle wall is a socket 14 arranged to cooperatively receive an electric plug connector 15 by means of which an electrical connection 16 may be made to the heating element.

The heating element assembly comprises an insulating core 17 which may be of mica or other suitable material upon which there is wound a resistance element 18. The core with the resistance element wound thereon produces a flat construction which is laterally insulated by means of insulating strips of mica or other material 19—19, the whole being assembled within a surrounding metallic sheath 20 which may be of soft copper or other suitable material.

The sheath is then laterally bent to form a split ring, the ends of this ring being supported in tubular passageways 21 and 22 which are laterally spaced apart in a projecting boss 23 integrally formed with and extending from a hollow body portion 24 of the base 12. This base may be formed of any suitable material, but is preferably formed from a material such as aluminum.

The hollow body portion 24 of the base is preferably of circular construction and terminates at its inner portion in a peripheral mounting flange 25 which is spaced from the end of the portion 24 and arranged to be secured to the wall of the teakettle by means of suitable screws which may threadedly engage the flange at its corners. In mounting the base on the teakettle wall, the wall is provided with a suitable opening 26 for receiving the end portion of the hollow base portion 24 therethrough. In order to prevent leakage between the mounting flange and the wall of the teakettle, it is preferred to provide a gasket 27 therebetween.

The hollow base portion 24 defines a main chamber 28 into which the ends of the heating element project. The open end of this chamber, which is slightly disposed outside the teakettle wall, is closed by the socket member 14 which is preferably constructed of a suitable insulating material such as a molded plastic. This socket may be secured in position by means of the same screws which are utilized for securing the base 12 to the teakettle wall. On one side, the socket 14 is provided with a peripheral flange 29 defining a recess 30 for receiving the associated end of the hollow portion 24 thereinto, when the flange 29 is secured in abutting relation with the outer surface of the teakettle wall.

On the opposite side of the socket is a peripherally extending flange 31 which forms a plug receiving socket 32.

Suitably mounted within the socket 32 is a pair of contacts 33 adapted to engage with contacts 34 carried by the plug, when the plug and socket are cooperatively associated by pushing one end of the plug into the socket 32. Suitable connectors 35 extend from the heating element and connect the ends of the heating element to the respective contacts of the socket.

The connections 35—35 are insulatingly separated by a projection 36 integrally formed with the socket 14 and extending into the chamber 28. The projection 36 is provided with a central passageway 37 which is slightly expanded at the end thereof which communicates with the socket 32, and contracted as shown at 38, where it communicates with the chamber 28.

A plunger 39 is mounted in the contracted portion 38 for reciprocable movement, and is provided at one end with a head 40 which is adapted to seat in the expanded end of the passage, when the plunger is pushed inwardly against the action of a spring 41 which is disposed within the passageway surrounding the plunger, one end of this spring being in abutting relation with the head 40, and the other end of the spring abutting a shoulder 42 defined by the contracted end 38 of the passageway.

It will be noted that the spring 41 tends to move the plunger outwardly so that the head 40 engages the innermost end of the plug connector and, if the plunger were free to move, would force the plug out of the socket and disconnect the plug and socket contacts.

This outward movement of the plunger is normally prevented by means of a latching mechanism which will now be described.

The projecting portion 23 of the base structure is provided with an interior socket 43 which is disposed between the ends of the heating element and communicates at its open end with the chamber 28.

Supported within the socket 43 is a substantially U-shaped bracket 44, the legs of this bracket forming a support for the respective ends of a shaft 45. This shaft is flatted on one side as shown at 46 to keep it from turning in flatted apertures 47 in the leg portions of the bracket.

The shaft 45 rotatably supports a ratchet wheel 48 having a plurality of peripherally formed ratchet teeth 49. This ratchet wheel is retained against rotative movement on the shaft by means of a fusible material 50 disposed between the interior of the wheel and shaft, the fusible material preferably being a metal which will melt at a temperature of between 200° F. and 300° F. It will therefore be apparent that the fusible metal will secure the ratchet wheel against rotation at normal temperatures, but if an abnormal temperature is encountered, within the limits of the fusibility of the metal, then the metal will start to melt and permit the ratchet wheel to be rotated relative to the shaft.

The ratchet wheel forms one element of a latching mechanism and comprises a detent in which the ratchet teeth are arranged to cooperate with a circumferentially extending tooth 51 on a catch member 52 which may be secured to the adjacent end of the plunger 39 as by a threaded connection 53.

The contracted opening 38 of the passageway through the projection 36 forms a loose fit with the plunger. When the plug 15 is inserted in the socket to connect the apparatus with a suitable electric circuit, the plug depresses the plunger and moves the tooth 51 at the inner end of the plunger over the inclined teeth of the ratchet wheel so that the tooth 51 will latchingly engage one of the ratchet teeth. Due to the loose fit of the plunger in opening 38, the tooth end of the plunger may deflect sufficiently from straight line movement to permit the passage of the tooth 51 into latching position with one of the ratchet teeth. The action of spring 41 then acts to maintain the latch teeth in engagement.

With the appliance latched as just explained, the plunger will be prevented from moving outwardly to separate the plug from the socket and thus disconnect the electrical circuit from the apparatus. This condition will prevail so long as the apparatus is operated at normal temperatures. However, should the apparatus reach an abnormal temperature, such as might occur when liquid contained in the apparatus has evaporated to such an extent as to cause overheating, the fusible metal will start to melt. This melting of the metal enables the ratchet wheel to turn on its supporting shaft and thus release the tooth 51 and unlatch the plunger so that it may move outwardly and disconnect the plug and receptacle. This forms a visual indication to the user of the apparatus that more liquid should be put into the apparatus, and at the same time prevent the apparatus from overheating.

As soon as the latching tooth on the ratchet which has been effective is released, the movement of the plunger in rotating the ratchet wheel will bring the next tooth into proper position for latchingly cooperating with the tooth 51 of the plunger, when the plunger is again depressed. Of course, as soon as the electric circuit it disconnected, the apparatus will begin cooling and the fusible metal upon cooling will again connect the ratchet wheel against rotation on the shaft, so that the plunger may be again latched in safety position.

The use of a ratchet wheel having latching teeth thereon provides a plurality of latching members which are successively moved into latching position by the unlatching operation of the appliance.

From the foregoing description, it will be apparent that the present invention provides an improved safety appliance which is latched against operation at normal temperatures, but which will be unlatched for operation at abnormal temperatures to disconnect the electrical connections to the heating apparatus, and which includes a novel and improved resetting mechanism for the latch.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim as my invention:

1. In a safety appliance for electrically heated apparatus, a metallic base adapted to support a heating element, an insulating member carried by said base, a straight plunger bar guidingly supported in said member for reciprocable movement and for lateral play movement therein and having a tooth at its innermost end, a spring surrounding said plunger and biasing its movement in an outward direction, a toothed ratchet wheel, a horizontally disposed shaft having a flat portion on one side only cooperating with the bore of said wheel to define a reservoir, a tooth of said wheel being engageable by the tooth of said plunger when the plunger is depressed against its spring, fusible means in said reservoir normally retaining the wheel against rotation at normal temperatures, but releasing it for rotation at abnormal temperatures, and a manually operable externally positioned circuit controller arranged in connecting position to depress the plunger and to be moved to disconnecting position when the plunger is released relative to the wheel.

2. In a safety appliance for electrically heated apparatus having a container forming wall, a socket mounted in said wall, said socket having an end of insulating material disposed exteriorly of the wall, a flange on said end defining a recess for guidingly receiving an end of a connection plug, a plunger guidingly supported in the socket for reciprocable movement and for lateral play movement therein, one end of the plunger being disposed in said recess and adapted to be depressed by the insertion of said plug into the recess, a spring opposing depressing movement of the plunger, and thermally controlled means in the socket for latching the plunger in depressed position, but releasing the plunger to push the plug out of the recess when the temperature acting on said means reaches a predetermined value.

3. In a safety appliance for electrically heated apparatus, an insulating block supported from a wall of the apparatus, a pair of exposed spaced stationary contact members projecting outwardly from said block, a circuit cord connector slidably connectable with the contact members, a passage through the block between said contact members, an elongate plunger guidingly supported in the passage for longitudinal reciprocable movement, rotative movement and lateral play movement therein, a spring in the block surrounding the plunger and biasing it for movement in an outward direction, said plunger being arranged to be depressed by the connecting movement of the circuit cord connector with the contacts, a head portion formed at the innermost end of the plunger defining a continuous tooth extending circumferentially of the plunger longitudinal center line, a latch member engageable by the tooth in the depressed position of the plunger irrespective of the position to which the plunger is rotated, and fusible means arranged upon melting to release the latch member relative to said tooth, whereupon the plunger is freed for biased movement to eject and disconnect the cord connector relative to the stationary contacts.

ALFRED E. LANIGAN.